United States Patent [19]
DeHoff et al.

[11] Patent Number: 4,905,571
[45] Date of Patent: Mar. 6, 1990

[54] AIR BOOSTER WITH PRESSURE-BALANCED VALVE

[75] Inventors: Edward J. DeHoff, Huber Heights; Donald E. Schenk, Vandalia; Jon E. Miller, Spring Valley, all of Ohio

[73] Assignee: General Motors Corporation, Detroit, Mich.

[21] Appl. No.: 239,098

[22] Filed: Aug. 31, 1988

[51] Int. Cl.$^4$ .............................................. F15B 9/10
[52] U.S. Cl. ................................. 91/373; 91/376 R; 92/97
[58] Field of Search ................... 91/369.1, 369.2, 370, 91/372–374, 376 R, 377, 390; 92/81, 97

[56] References Cited

U.S. PATENT DOCUMENTS

| | | | |
|---|---|---|---|
| 2,976,850 | 3/1961 | Stelzer | 91/376 X |
| 3,013,536 | 12/1961 | Cripe | 91/369.2 |
| 3,143,926 | 8/1964 | Stelzer | 91/370 X |
| 4,633,760 | 1/1987 | Wagner | 91/369.2 |

FOREIGN PATENT DOCUMENTS 157951  8/1985  Japan ................................ 91/369.2

Primary Examiner—Robert E. Garrett
Assistant Examiner—George Kapsalas
Attorney, Agent, or Firm—Ernest E. Helms

[57] ABSTRACT

The invention provides a brake booster including in a preferred embodiment a housing, first and second annular flexible diaphragms spaced from one another forming a sealed second chamber within the housing and a sealed first chamber between the first diaphragm and the first end of the housing, a generally annular shaped power piston for connection with the master cylinder piston, a chamber valve seat separating the first and second chambers, an inlet valve slidably mounted within the power piston, and a control valve spring biased away from the power piston and connected with the pedal linkage and being slidably and sealably mounted within first end of the housing.

7 Claims, 2 Drawing Sheets

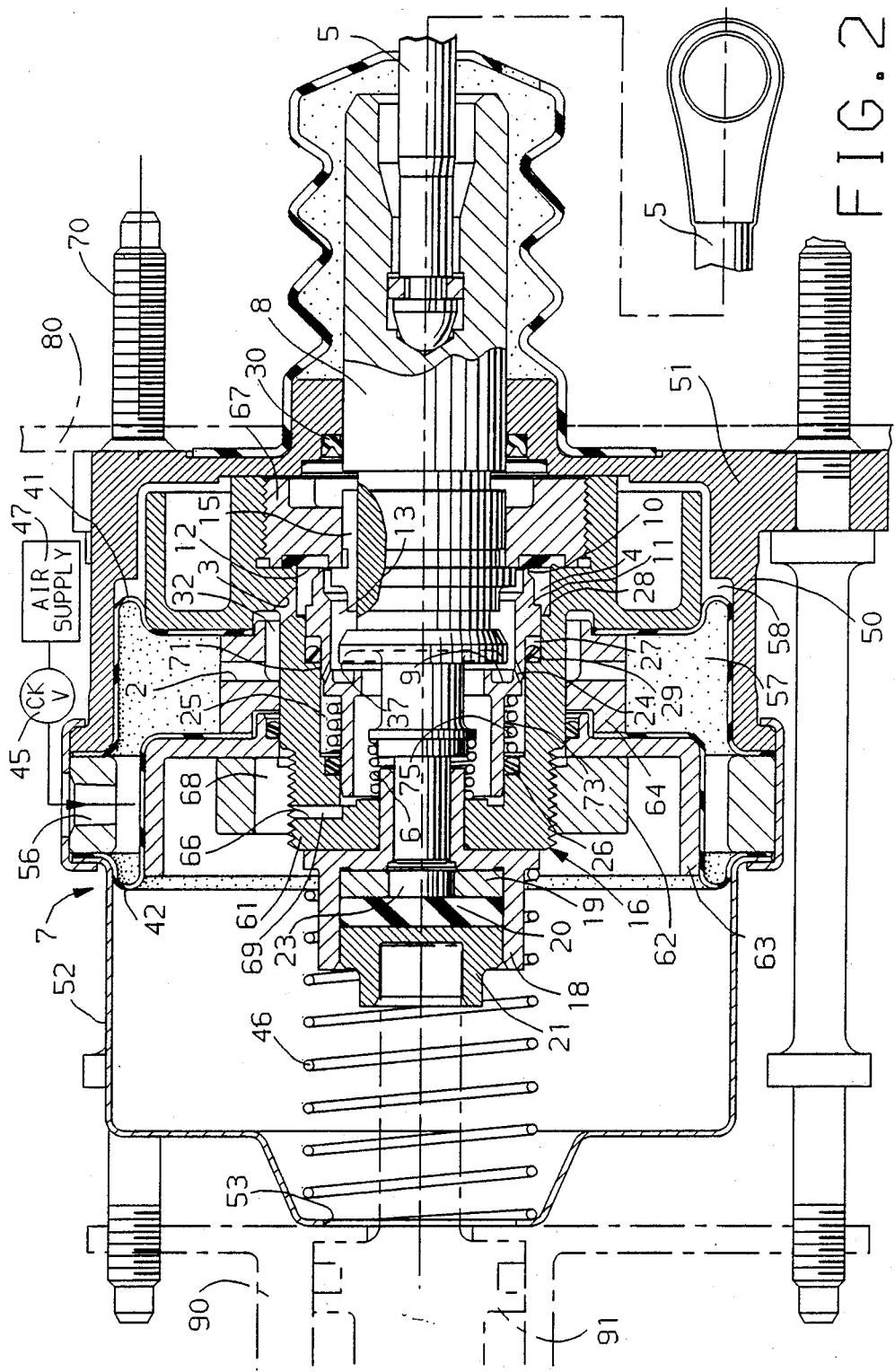

AIR BOOSTER WITH PRESSURE-BALANCED VALVE

BACKGROUND OF THE INVENTION

1. Field of the Invention

The field of this invention is that of an apparatus and method of utilization thereof of a fluid powered booster for vehicle hydraulic braking systems.

2. Description of the Prior Art

It is known in the art to provide a booster for increasing the force exerted on the piston of a vehicle hydraulic brake master cylinder. Most boosters utilize the vacuum supplied by the internal combustion engine of the vehicle. Vacuum supplied power boosters tend to be large. In smaller vehicles, space constraints underneath the hood can make the vacuum boosters very difficult to fit in the space available. As a result of the size of vacuum boosters it is virtually impossible to place them within the passenger compartment of the vehicle. Meeting the challenge of vehicle emission standards and the use of turbo chargers has reduced the amount of vacuum which is available for use with the brake booster. Furthermore, on mid-sized trucks the amount of vacuum available is often borderline for full activation of the braking system, thereby making the provision of an alternative booster advantageous.

An alternative to the vacuum booster is a hydraulic booster. Typically the hydraulic booster offers greater capacity, however, most hydraulic boosters require the addition of an electro-hydraulic pump or are parasitic off of the power steering system pump, thus requiring the hydraulic system supporting the booster to have an accumulator for additional capacity. The cost of the hydraulic system is one of the main factors discouraging the use of hydraulic boosters.

SUMMARY OF THE INVENTION

To overcome the disadvantages of many prior vacuum or hydraulic brake boosters the present invention is brought forth. The present invention provides a brake booster which can use any pressurized fluid. The present inventive brake booster in its preferred embodiment provides a brake booster having a wide range of application in a very small size that can be utilized in cars as well as mid-sized trucks. The new brake booster has a very low hysteresis because of its low friction and has no requirement for sliding seals. The present inventive brake booster has opposed rolling diaphragms. The rolling diaphragms are advantageous in that with the combination of a check valve the booster has its own air reservoir providing braking power after failure of any air supply system for a limited amount of powered braking. Additionally, the inventive booster offers a more desirable response than that previously available therefore providing a firmer brake pedal action and faster activation.

It is an object of the present invention to provide a pressurized fluid vehicle brake booster for connection between a brake pedal linkage and a piston of a master cylinder, the booster includes a housing having means of connection with the vehicle and the master cylinder, the housing also having a fluid inlet and the housing having a first end being generally sealed and having a second end of the housing with a vent, first and second annular flexible diaphragms spaced from one another forming a sealed second chamber within the housing a sealed first chamber between the first diaphragm and the first end of the housing, the second chamber being in fluid communication with the housing fluid inlet, a generally annular shaped power piston for connection with the master cylinder piston, the power piston being spring biased in a first direction and the power piston exterior being connected with both of the diaphragms, and the power piston having a first fluid passage connecting the second chamber with the power piston interior and a second fluid passage from the interior of the power piston to an area in the second end of the housing, a chamber valve seat separating the first and second chambers, a spring biased annular inlet valve slidably mounted within the power piston with a fluid passage between an exterior of the inlet valve and an interior of the inlet valve, the inlet valve having a valving surface of a first diameter in contact with the chamber valve seat preventing fluid communication between the power piston first passage and the first chamber and the inlet valve having a first exterior sealed sliding surface at the same diameter of the valving surface, and the inlet valve having a second exterior sealed sliding surface at a second diameter which differs from the first diameter of the first sealed sliding surface and the inlet valve having a valve seat, and a control valve spring biased away from the power piston and connected with the pedal linkage and being slidably and sealably mounted within first end of the housing at the second diameter, the control valve having a valving surface at the second diameter for contacting the inlet valve seat, whereby movement of the control valve by the brake pedal linkage causes the control valve valving surface to contact the inlet valve seat to seal off the interior of the inlet valve from the vent and further movement of the control valve against the spring biasing of the inlet valve causes the inlet valve valving surface to be removed from the chamber valve seat allowing fluid from the second chamber to pass to the first chamber to urge the power piston against the master cylinder piston and whereby in the activated position the inlet valve and the control valve are pressured balanced by the fluid.

It is an object of the present invention to provide a pressurized pneumatic vehicle brake booster for connection between a brake pedal linkage and a piston of a master cylinder, the booster includes a housing having an exterior bolting for connecting the housing to the master cylinder and to the vehicle, the housing having an inlet and the housing having a first end being generally sealed and a second end with a vent to the atmosphere, first and second annular flexible diaphragms spaced from one another forming a sealed second chamber within the housing between the diaphragms and a sealed first chamber between the first diaphragm and the first end of the housing and the second chamber being in fluid connection with the housing fluid inlet, a generally annular shaped power piston for connection with the master cylinder piston and for imparting a force thereto, the power piston being spring biased away from the master cylinder and the power piston exterior being connected with both the diaphragms, the power piston having a valve seat separating the first and second chambers, and the power piston having a first fluid passage connecting the second chamber with the power piston interior and a second fluid passage from the interior of the power piston into an area of the housing second end, an annular inlet valve spring biased away from the master cylinder and slidably mounted within the power piston with a fluid passage between an exterior of the inlet valve and an interior of the inlet valve, the inlet valve having a valving surface at a first diameter for contact with the power piston valve seat for preventing fluid communication between the power piston first passage and the first chamber, and the inlet valve having a first exterior sealed sliding surface at the same diameter of the valving surface, and the inlet valve having a second exterior sealed sliding surface at a second diameter less than the first diameter and the inlet valve having a valve seat, and a control valve spring biased away from the power piston and connected with the pedal linkage and being slidably and sealably mounted at the second diameter along the first end of the housing, the control valve having a valving surface at the second diameter for contacting the inlet valve seat, and the control valve having mechanical feedback means for imparting the control valve a fraction of the force imparted by the power piston upon the master cylinder piston whereby movement of the control valve from the brake pedal causes the control valve valving surface to contact the inlet valve seat to seal off the interior of the inlet valve from the vent and further movement of the control valve against the spring biasing causes the inlet valve valving surface to be removed from the power piston valve seat allowing fluid from the second chamber to pass to the first chamber to urge the power piston against the master cylinder piston and whereby in the activated position the inlet valve and the control valve are pressure balanced by the pressurized air.

It is an object of the present invention to provide a method of boosting the force exerted by a vehicle occupant on a brake pedal linkage against the piston of a master cylinder, the method including connecting with the vehicle a housing having a first end being generally sealed and a second end being vented and having an inlet for admittance of pressurized fluid, connecting with the housing first and second annular flexible diaphragms to form a second sealed chamber between the diaphragms and a first sealed chamber between the first diaphragm and first end of the housing, connecting with the first and second diaphragms and the master cylinder piston an annular power piston having a first fluid passage between the second chamber and the power piston interior, spring biasing the power piston away from the master cylinder piston, separating the first and second chambers with a chamber valve seat, slidably mounting and spring biasing an inlet valve within the power piston, the inlet valve having a fluid passage between the exterior of the inlet valve and the interior of the inlet valve, the inlet valve having a valving surface at a first diameter and a first sliding sealed surface at the first diameter and a valve seat at a second diameter and a second sliding sealed surface at a second diameter differing from the first diameter, spring biasing away from the power piston a control valve which is slidably and sealably mounted within the first end of the housing along the second diameter, the control valve having a valving surface at the second diameter for contacting the inlet valve seat, and moving the control valve whereby the control valve valving surface contacts the inlet valve valve seat and displaces the inlet valve away from the chamber valve seat whereby fluid is allowed to flow from the second chamber into the first chamber to move the power piston against the master cylinder piston and whereby the inlet valve and the control valve are pressure balanced by the pressurized fluid.

Further objects and advantages of the present invention can become more apparent to those skilled in the art as the nature of the invention is better understood from the accompanying drawings and a detailed description.

BRIEF DESCRIPTION OF THE DRAWINGS

FIG. 2 is a view along line 2—2 of FIG. 1.

DESCRIPTION OF THE PREFERRED EMBODIMENT

Figure 1:
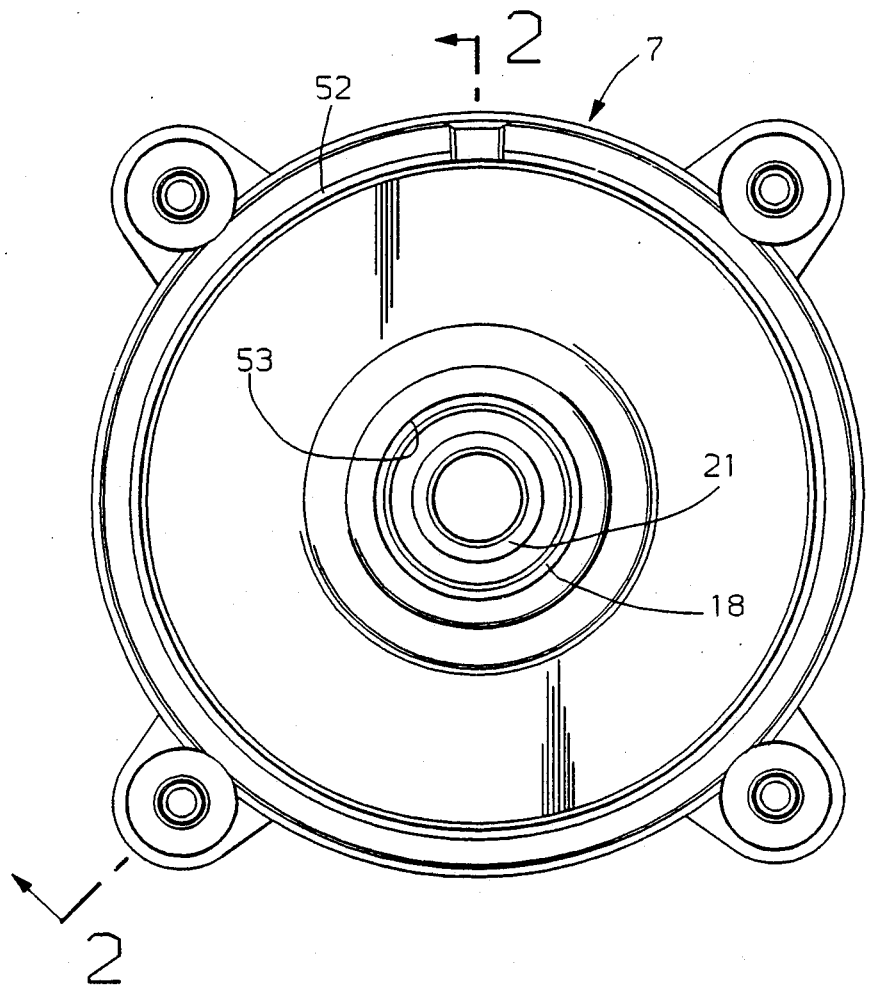
FIG. 1 is a side elevational view of a preferred embodiment brake booster according to the present invention.

Referring to FIGS. 1 and 2 inventive pneumatic brake booster system 7 is a servomechanism designed to multiply the manual pedal force provided by the driver of a vehicle 80 to operate the vehicle brake system via the master cylinder piston 91. The booster 7 is connected between the brake pedal linkage 5 and the piston 91 of the master cylinder 90. Pressurized air is the energy transfer medium described below, however, other mediums (for example, hydraulic fluid) may be used with minor modifications.

FIG. 1 shows the booster 7 in the normal position prior to brake application. The booster 7 has a housing 50. The housing 50 has a first end 51 and a second end 52. First end 51 is generally sealed and second end 52 is open to the atmosphere through a vent 53. First end 51 also has an inlet 56.

Within the housing 50 are two annular flexible diaphragms 41, 42 which are spaced from one another forming a sealed air storage second chamber 57 or air reservoir. The second chamber 57 is in fluid communication with the fluid inlet 56. Between the first flexible diaphragm 41 and the housing first end 51 is a sealed first chamber 58. Sealingly connected with the first 41 and second 42 diaphragms along its exterior is an annular shaped power piston 16. The piston 16 has an inner ring 61, front ring 62, intermediate ring 63 and rearward ring 64. The rearward ring 64 mounts first and second diaphragms 41 and 42 respectively. Intermediate ring 63 forms second diaphragm 42. Front ring 62 is threaded to inner ring 61 and holds rings 63 and 64 in place. The piston 16 has a first fluid passage 32 connecting the second chamber 57 with the interior of piston. Passage 32 is comprised of passage 2 in ring 64 and passage 3 in ring 61. The piston 16 is biased by a spring 46 in a first direction away from the master cylinder which it is operatively associated with.

The piston 16 has a second fluid passage 66 from its interior to an area of the housing second end 52 formed by slots 69 and 68 of rings 62 and 61 respectively. A chamber valve seat insert 67 separating the first 58 and second 57 fluid chambers is threadably connected to the ring 61. Valve seat insert 67 has a chamber valve seat sealing surfaces 12 made of a compressible material. Control valve 8 has a passage 15 connecting the second 57 and first 58 fluid chambers.

Slidably mounted within piston 16 is an inlet valve 11. The inlet valve 11 is biased by spring 75. The inlet valve 11 has a modulated fluid passage 24 between its interior and exterior The inlet valve also at a first larger diameter has a valving surface 10 for contact with the valve seat 12 to prevent fluid communication between the piston first passage 32 and the first chamber 58. The inlet valve 11 also has an exterior first sliding sealed surface 71 at the first diameter sealed by an O-ring 29.

At a second diameter, differing from the first diameter (smaller) the inlet valve 11 has a second exterior sealed surface 73 and is sealed by O-ring 26. At the second diameter the inlet valve 11 has an exhaust valve seat 9.

A control valve 8 is connected with the master cylinder piston 91 and the brake linkage 5. The control valve 8 is biased by a spring 6 away from piston 16. The control valve 8 is slidably and sealably connected in the first end 51 of the housing and is sealed by a lip (or other type seal) seal 30 at the second diameter.

At the second diameter the control valve 8 has a valving surface 37 for mating with the valve seat 9 at the second diameter. Movement of the control valve 8 by the brake pedal (via push rod 5) causes the control valve valving surface 37 to contact the valve seat 9 to seal off the interior of the inlet valve 11 from the vent 53.

Pressurized air from a supply source 47 passes through a check valve 45. The air then passes into the second chamber 57. Connecting passages 2 and 3 form a power piston first fluid passage to admit supply pressurized air to annulus 4. All other areas of the booster 7 are at atmospheric pressure. When force is applied at the push rod 5 part of the brake linkage, sufficient to overcome spring 6, the valving surface 37 of the control valve 8 is moved into contact with the valve seat 9, closing the annulus 13 from the atmosphere. Further motion (of control valve 8) moves the valving surface 10 of the inlet valve 11 away from contact with the valve seat 12 admitting the supply pressure from second chamber 57 to annulus 13. From annulus 13, supply pressure is admitted to first chamber 58 through passage 15 (formed by a milled slot in control valve 8). The imbalance of pressure behind power piston 16 causes a force in the direction of the push rod 5 force (towards the master cylinder 90). The rolling diaphragms 41 and 42 allow the piston 16 to move in the direction of the push rod force and to push against a reaction support 18 through a reaction ring 19, through a reaction disc 20, through a master cylinder piston guide 21, and finally against the primary piston 91 of a conventional hydraulic master cylinder 90, to apply the brakes of the vehicle.

Since the reaction disc 20 is a relatively soft elastomer, the force applied to it tends to displace a portion of its volume through the slidable reaction piston 23 to the end of the control valve 8 and hence through the push rod 5 and on to the brake pedal where a force proportional to the area of master cylinder piston guide 21 and the reaction piston 23 and the lever ratio of the pedal is transmitted to the foot of the driver. The above-noted mechanism, by providing a force directly proportional to that applied to the master cylinder piston 91, provides the driver with the "feel" necessary to a controlled vehicle stop. Using this feedback mechanism, the driver is able to meter the supply pressure from second chamber 57 to first chamber 58 and is in full control of the modulated pressure in second chamber 58.

During brake apply the modulated or variable pressure also exits in the annulus 13. Passage 24 admits modulated air into an annulus 25. Since the diameter at the inside of seal 26 is equal to that of the valving surface 37 of the control valve 8, and the pressure on both areas is modulated pressure, it follows that the inlet valve 11 is balanced for any value of modulated pressure. Modulated air in annulus 13 is admitted to first chamber 58 through passage 15. Since the diameter at the inside of seal 30 is equal to that of the valving surface 37 of the control valve 8 and the pressure on both areas is modulated pressure, it follows that the control valve 8 is balanced for any value of modulated pressure. The above together with the balancing of the inlet valve 11 (described later) provides for a controlled force between valving surface 37 of the control valve 8 and the face of the valve seat 9 which is unaffected by modulated pressure.

Supply air in an annulus 4 is admitted to an annulus 27 through the clearance 28 between the inlet valve 11 and the power piston 16. Since the diameter at the inside of seal 29 is equal to that of the valving surface 10 of the inlet valve 11 and the pressure on both areas is supply pressure, the inlet valve 11 is balanced for any value of supply pressure. The above provides for a controlled force between valving surface 10 of the inlet valve 11, and the valve seat 12, which is unaffected by supply pressure.

In other words, the pressure within the annulus 4 will equal the pressure within the annulus 27 due to leakage through the clearance 28. In like manner, the pressure within the annulus 13 will equal to pressure within the annulus 25 due to passage 24. The area in which the pressure within annulus 27 acts upon inlet valve 11 is defined by the area between the diameter of the first sliding sealed surface 71 and the maximum outer diameter of the inlet valve 11. The pressure of annulus 4 acts upon the identical area of the inlet valve 11 in an opposite direction since the valving surface 10 is at the same diameter as the first sliding sealed surface 71. Therefore, for any value of modulated pressure, the portion of the inlet valve radially outward from the first sliding sealed surface 71 is balanced. Due to the passage 24, the pressure within the annulus 25 will equal the pressure within the annulus 13. When the control valve 8 has been displaced towards the master cylinder piston 91 such that the valving surface 37 contacts the valve seat 9 the pressure within the annulus 13 will act upon the same area, (defined by the area between diameter of the first sliding sealed surface 71 or valving surface 10 and the diameter of valving surface 37 or second sliding sealed surface 73). Radially inward from the valving surface 37, all areas of the control valve piston 11 will be acted upon by atmospheric pressure (assuming a seal between the valving surface 37 and the valve seat 9). Therefore, a pressure balance exists.

Without the various balancing arrangements described above, the device would tend to self-apply, self-release, or create variable forces for different pressure values dependent on the magnitude and/or direction of the area imbalance.

When the force on the brake pedal is reduced, the reaction forces urge the control valve 8 in a direction to allow the valving surface 10 of the inlet valve 11 to again contact the inlet valve seat 12, sealing annulus 13 from supply pressure and maintaining the brake apply force as is. This is known as "poise" position. Further reduction of pedal force moves the valving surface 37 of the control valve 8 away from the valve seat 9 and opens annulus 13 to atmospheric pressure. If the valving surface 37 remains out of contact with valve seat 9, all modulated pressure will be lost and the vehicle brakes will be released.

The concept of using two opposed rolling diaphragms 41,42 to admit pressurized fluid to the valving area from a stationary housing has the advantage of providing a low friction leak-proof means of transferring pressurized fluid from the stationary housing 50. Also the diaphragms 41,42 in combination with check valve 45 serve as a fluid reservoir for emergency stops when a compressible medium is employed.

The exterior bolting arrangement provides a means of transmitting brake loads from the master cylinder 90 to the support area of the vehicle fire wall 80. The above construction eliminates the necessity for heavy booster housing structures to support the brake transmitted loads. Four bolts 70 are shown in the present design. However three-bolt or two-bolt configurations are feasible. Other designs utilize bolts for carrying master cylinder loads, however, prior boosters use bolts that pierce the housing walls necessitating expensive seals with additional friction at several points on each bolt. The design of the present booster 7 uses fully exterior bolts 70 that require no seals of any kind.

The present invention provides a method of boosting the force exerted by a vehicle occupant on a brake pedal against the piston 91 of a master cylinder 90 the method in combination comprising:

1. Connecting with the vehicle 80 a housing 50 having a first end 51 being generally sealed and a second end 52 being vented 53 and having an inlet 56 for admittance of pressurized fluid 47;

2. Connecting with the housing 50 first 41 and second 42 annular flexible diaphragms to form a second sealed chamber 57 between the diaphragms and a first sealed chamber 58 between the first diaphragm 41 and the first end 51 of the housing;

3. Connecting with the first 41 and second 42 diaphragms and the master cylinder piston 91 an annular power piston 16 having first fluid passage 32 between the second chamber 57 and the power piston 16 interior;

4. Spring 46 biasing the power piston 16 away from the master cylinder piston 91;

5. Separating the first 57 and second chambers 58 with a chamber valve seat 12;

6. Slidably mounting and spring 75 biasing an inlet valve 11 within the power piston 16, the inlet valve 11 having a fluid passage 24 between the exterior of the inlet valve 11 and the interior of the inlet valve 11, the inlet valve 11 having a valving surface 10 at a first diameter and a first sliding sealed surface 71 at the first diameter and a valve seat 9 at a second diameter and a second sliding sealed surface 73 at the second diameter, the second diameter differing from the first diameter;

7. Spring 6 biasing away from the power piston a control valve 8 which is slidably and sealably mounted within the first end 51 of the housing along the second diameter, the control valve 8 having a valving surface 37 at the second diameter for contacting the inlet valve seat 9; and 8. Moving the control valve 8 whereby the control valve valving surface 37 contacts the inlet valve valve seat 9 and displaces the inlet valve 11 away from the chamber valve seat 12 whereby fluid is allowed to flow from the second chamber 57 into the first chamber 58 to move the power piston 16 against the master cylinder piston 91 and whereby the inlet valve 11 and the control valve 8 are pressure balanced by the pressurized fluid.

While an embodiment of the present invention has been explained, it will be readily apparent to those skilled in the art of the various modifications which can be made to the present invention without departing from the spirit and scope of this invention as it is encompassed by the following claims.

We claim:

1. A pressurized fluid vehicle brake booster for connection between a brake pedal linkage and a piston of a master cylinder, said booster in combination comprising:

a housing having means of connection with said vehicle and said master cylinder, said housing also having a fluid inlet and said housing having a first end being generally sealed and having a second end of said housing with a vent;

first and second annular flexible diaphragms spaced from one another forming a sealed second chamber within said housing and a sealed first chamber between said first diaphragm and said first end of said housing, said second chamber being in fluid communication with said housing fluid inlet;

a generally annular shaped power piston operatively associated with said master cylinder piston, said power piston being spring biased in a first direction and said power piston exterior being connected with both of said diaphragms, said power piston having a first fluid passage connecting said second chamber with said power piston interior and a second fluid passage from said interior of said power piston to an area in said second end of said housing;

a chamber valve seat separating said first and second chambers;

a spring biased annular inlet valve slidably mounted within said power piston with a fluid passage between an exterior of said inlet valve and an interior of said inlet valve, said inlet valve having a valving surface of a first diameter in contact with said chamber valve seat preventing fluid communication between said power piston first passage and said first chamber and said inlet valve having a first exterior sealed sliding surface at said same diameter of said valving surface, and said inlet valve having a second exterior sealed sliding surface at a second diameter which differs from said first diameter of said first sealed sliding surface and said inlet valve having a valve seat; and a control valve spring biased away from said power piston and connected with said pedal linkage and being slidably and sealably mounted within first end of said housing at said second diameter, said control valve having a valving surface at said second diameter for contacting said inlet valve seat, whereby movement of said control valve by said brake pedal causes said control valve valving surface to contact said inlet valve seat to seal off the interior of said inlet valve from said vent and further movement of said control valve against said spring biasing of said inlet valve causes said inlet valve valving surface to be removed from said chamber valve seat allowing fluid from said second chamber to pass to said first chamber to urge said power piston against said master cylinder piston and whereby in said activated position said inlet valve and said control valve are pressure balanced by said fluid.

2. A vehicle brake booster as described in claim 1 wherein said fluid is air.

3. A booster a described in claim 2 wherein said chamber valve seat is connected with said power piston.

4. A vehicle brake booster as described in claim 1 wherein said housing is connected together with said master cylinder and said vehicle by exterior bolts.

5. A vehicle booster as described in claim 1 having mechanical feedback means exerting back a proportion of the force exerted upon said master cylinder piston back to said control valve.

6. A pressurized pneumatic vehicle brake booster for connection between a brake pedal linkage and a piston of a master cylinder, said booster in combination comprising:

a housing having an exterior bolting for connecting said housing to said master cylinder and to said vehicle, said housing having an inlet and said housing having a first end being generally sealed and a second end with a vent to the atmosphere;

first and second annular flexible diaphragms spaced from one another forming a sealed second chamber within said housing between said diaphragms and a sealed first chamber between said first diaphragm and said first end of said housing and said second chamber being in fluid connection with said housing fluid inlet;

a generally annular shaped power piston operatively associated with said master cylinder piston and for imparting a force thereto, said power piston being spring biased away from said master cylinder and said power piston exterior being connected with both of said diaphragms, said power piston having a valve seat separating said first and second chambers, and said power piston having a first fluid passage connecting said second chamber with said power piston interior and a second fluid passage from the interior of said power piston into an area of said housing second end;

an annular inlet valve spring biased away from said master cylinder and slidably mounted within said power piston with a fluid passage between an exterior of said inlet valve and an interior of said inlet valve, said inlet valve having a valving surface at a first diameter for contact with said power piston valve seat for preventing fluid communication between said power piston first passage and said first chamber, and said inlet valve having a first exterior sealed sliding surface at the same diameter of said valving surface, and said inlet valve having a second exterior sealed sliding surface at a second diameter less than said first diameter and said inlet valve having a valve seat; and a control valve spring biased away from said power piston and connected with said pedal linkage and being slidably and sealably mounted at said second diameter along said first end of said housing, said control valve having a valving surface at said second diameter for contacting said inlet valve seat, and said control valve having mechanical feedback means for imparting to said control valve a fraction of the force imparted by said power piston upon said master cylinder piston and whereby movement of said control valve from said brake pedal causes said control valve valving surface to contact said inlet valve seat to seal off the interior of said inlet valve from said vent and further movement of said control valve against said spring biasing causes said inlet valve valving surface to be removed from said power piston valve seat allowing fluid from said second chamber to pass to said first chamber to urge said power piston against said master cylinder piston and whereby in said activated position said inlet valve and said control valve are pressure balanced by said pressurized air.

7. A method of boosting the force exerted by a vehicle occupant on a brake pedal linkage against the piston of a master cylinder said method in combination comprising:

connecting with said vehicle a housing having a first end being generally sealed and a second end being vented and having an inlet for admittance of pressurized fluid;

connecting with said housing first and second annular flexible diaphragms to form a second sealed chamber between said diaphragms and a first sealed chamber between said first diaphragm and first end of said housing;

connecting with said first and second diaphragms and operatively associated with said master cylinder piston an annular power piston having a first fluid passage between said second chamber and said power piston interior;

spring biasing said power piston away from said master cylinder piston;

separating said first and second chambers with a chamber valve seat;

slidably mounting and spring biasing an inlet valve within said power piston, said inlet valve having a fluid passage between the exterior of said inlet valve and the interior of said inlet valve, said inlet valve having a valving surface at a first diameter and a first sliding sealed surface at said first diameter and a valve seat at a second diameter and a second sliding sealed surface at a second diameter differing from said first diameter;

spring biasing away from said power piston a control valve which is slidably and sealably mounted within said first end of said housing along said second diameter, said control valve having a valving surface at said second diameter for contacting said inlet valve seat; and moving said control valve whereby said control valve valving surface contacts said inlet valve valve seat and displaces said inlet valve away from said chamber valve seat whereby fluid is allowed to flow from said second chamber into said first chamber to move said power piston against said master cylinder piston and whereby said inlet valve and said control valve are pressure balanced by said pressurized fluid.

* * * * *